May 10, 1949.    H. E. LAUBACH ET AL    2,469,881
HEADSTOCK TRANSMISSION GEAR SHIFTING MECHANISM
Filed June 28, 1947    5 Sheets-Sheet 1
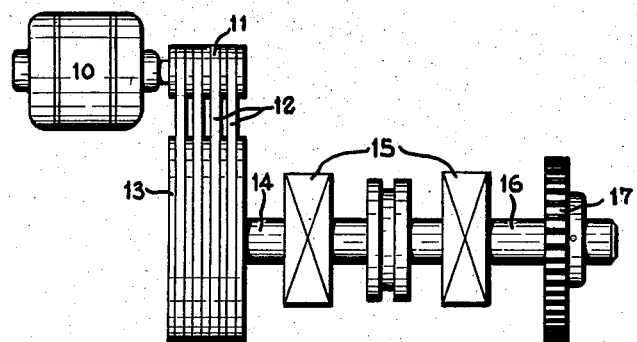
FIG.1
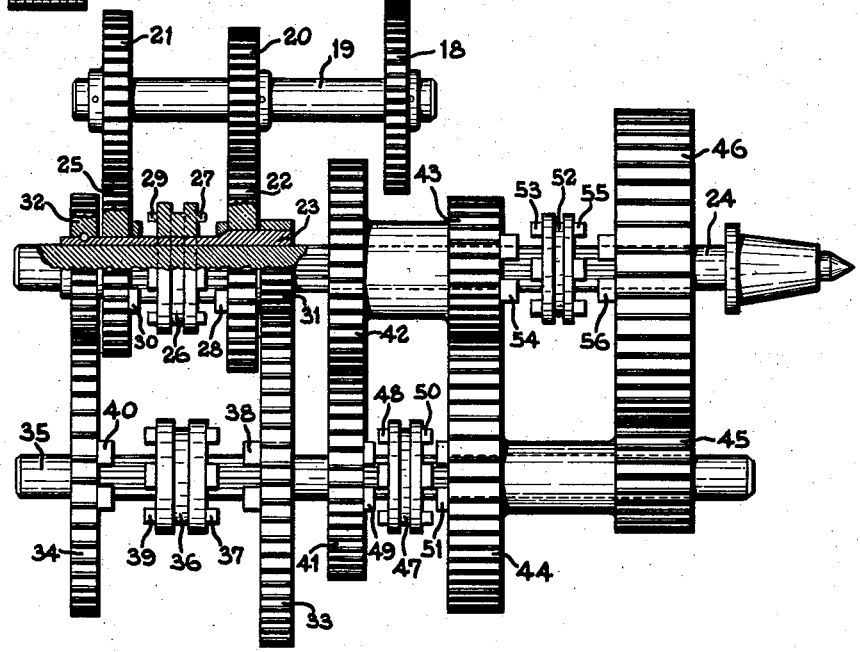
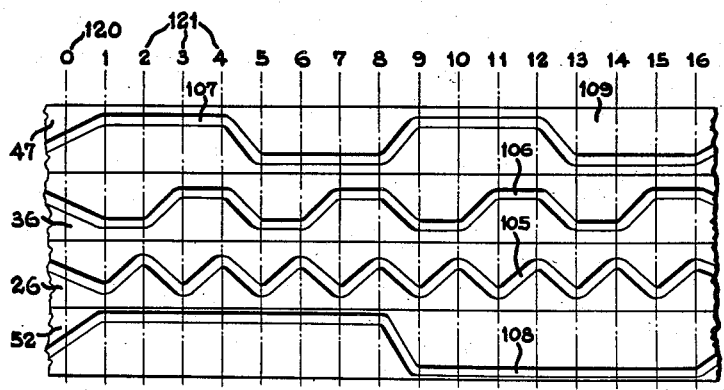
FIG.6
INVENTOR.
HOWARD E. LAUBACH.
ROBERT C. JOHNSON.
BY VINCENT J. KRAMER.
Toulmin & Toulmin
ATTORNEYS

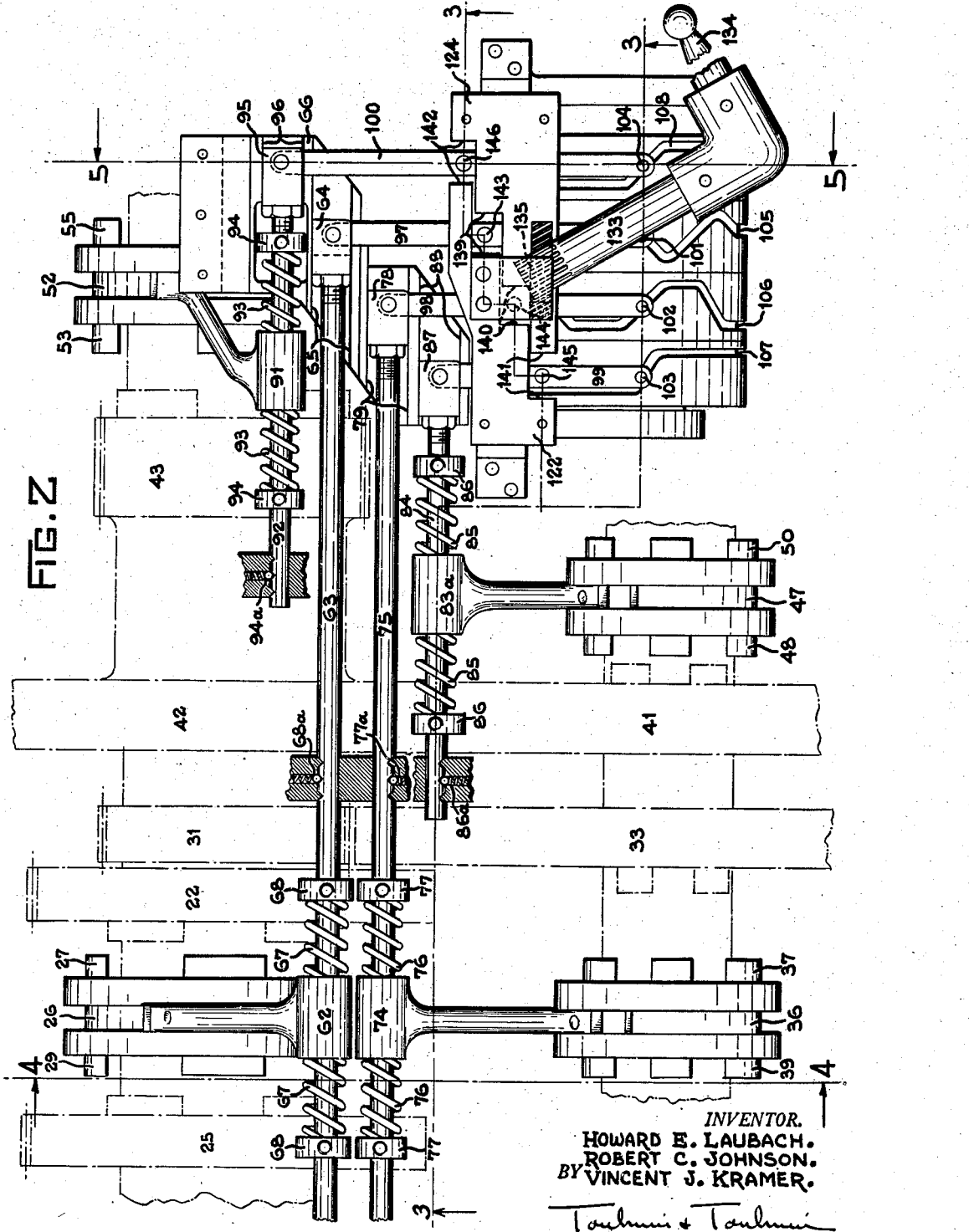

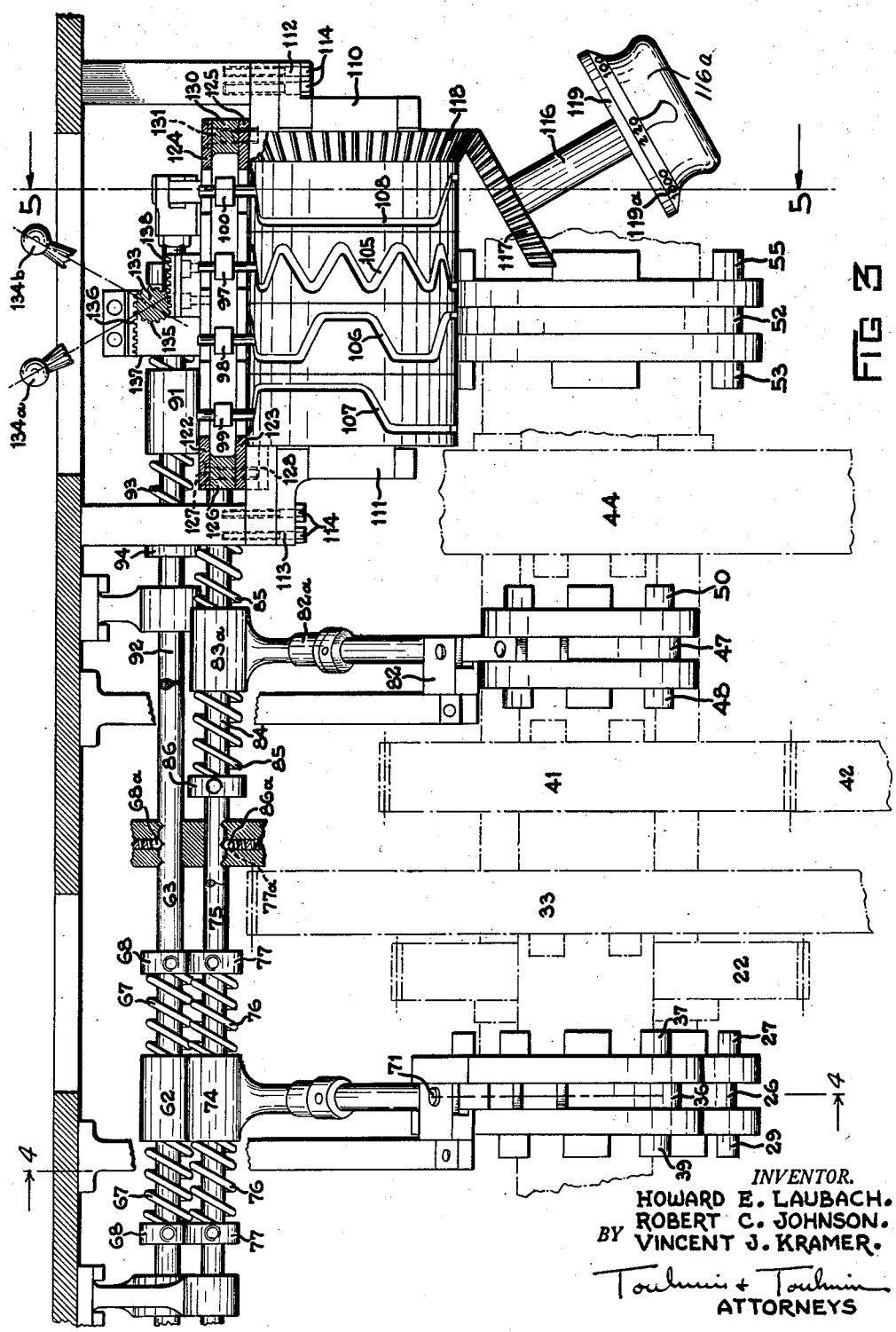

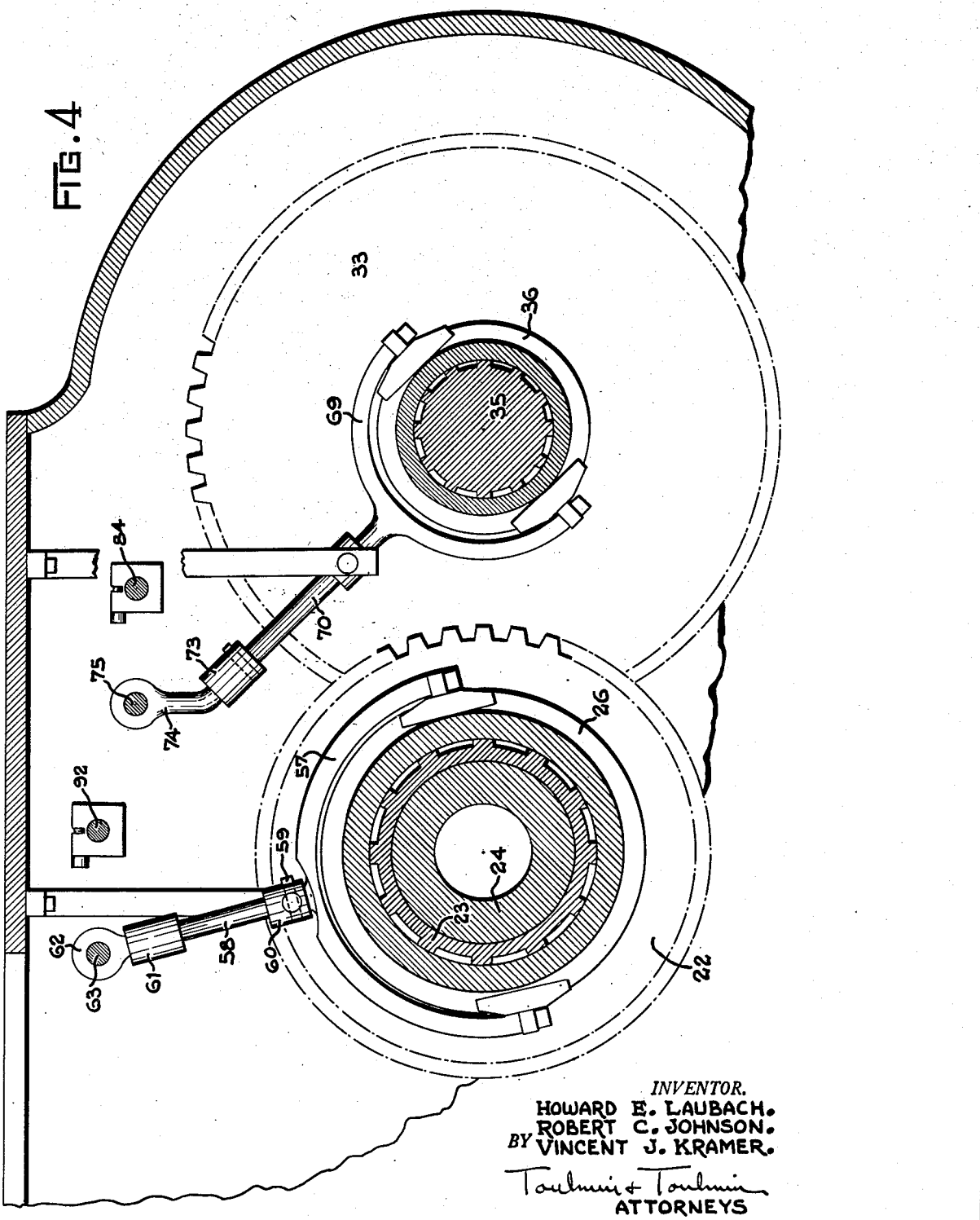

May 10, 1949.  H. E. LAUBACH ET AL  2,469,881
HEADSTOCK TRANSMISSION GEAR SHIFTING MECHANISM
Filed June 28, 1947  5 Sheets-Sheet 5
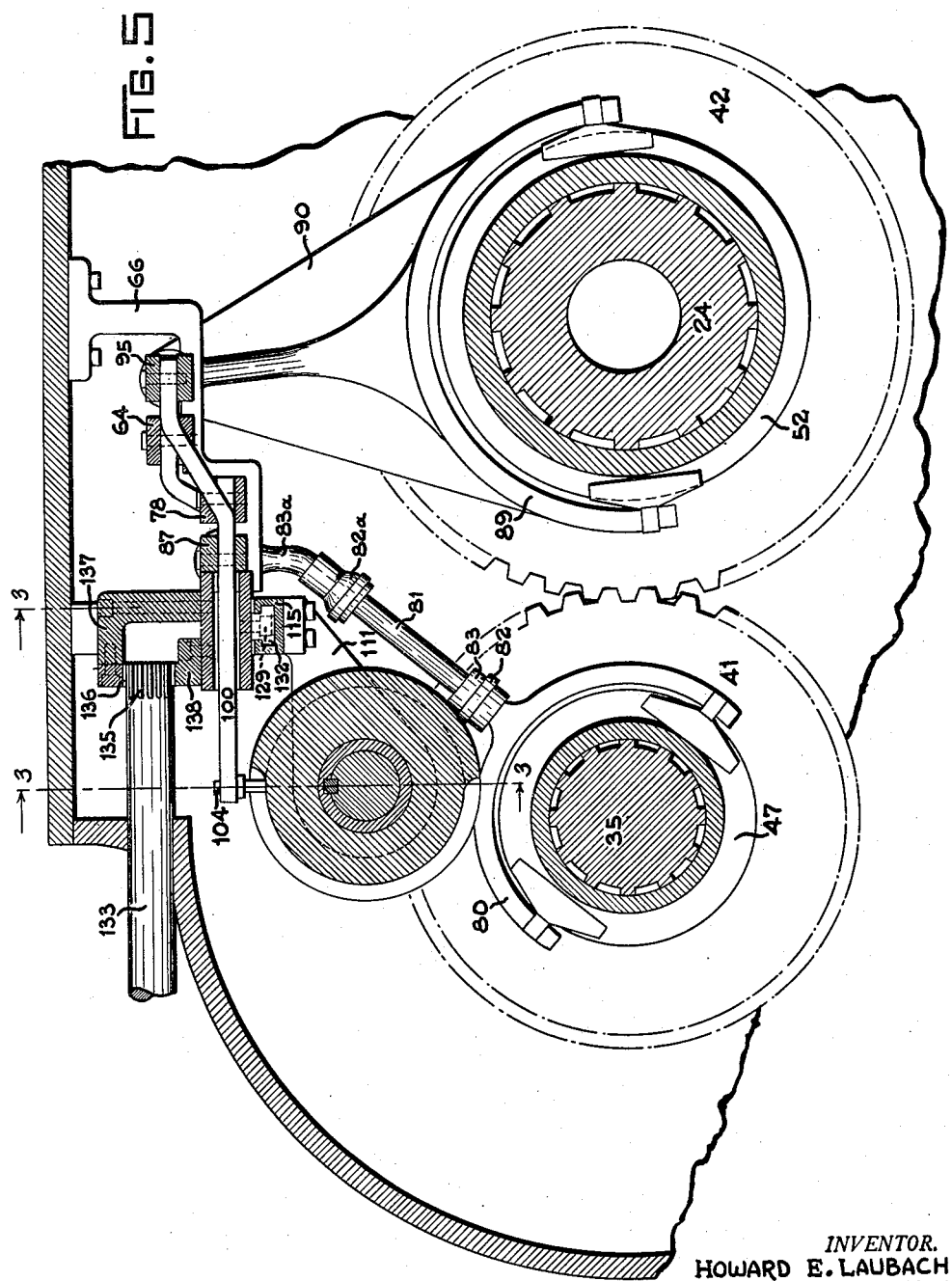
INVENTOR.
HOWARD E. LAUBACH.
ROBERT C. JOHNSON.
BY VINCENT J. KRAMER.
Toulmin + Toulmin
ATTORNEYS Patented May 10, 1949

2,469,881

UNITED STATES PATENT OFFICE 2,469,881

HEADSTOCK TRANSMISSION GEAR SHIFTING MECHANISM

Howard E. Laubach, Cincinnati, and Robert C. Johnson and Vincent J. Kramer, Norwood, Ohio, assignors to The Boye & Emmes Machine Tool Company, Cincinnati, Ohio, a corporation of Ohio Application June 28, 1947, Serial No. 757,848

11 Claims. (Cl. 74—334)

This invention pertains to improvements in machine tools and is particularly directed to an improved headstock transmission gear shifting mechanism.

One of the objects of this invention is to provide a gear shifting mechanism for a headstock transmission which may be adjusted to preselect a desired speed change for the transmission.

Another object is to provide a control mechanism for effecting speed changes in a lathe headstock transmission in which a preselecting setting dial is utilized to determine the speed desired and to provide in conjunction with the dial a shifting lever which is operable to effect the shifting of the transmission to desired speed set up by the dial.

A further object of this invention is to provide a dial operated cam drum which may be adjusted to position a series of levers, connected to operate the shiftable members of a headstock transmission, to preselected positions and to engage said levers when so positioned by a shifting mechanism, operated by a shifter lever, to shift the transmission to desired speed selection.

It is also an object of this invention to provide a gear shifting mechanism having a shifting lever movable to speed selecting and shifting positions and a preselecting setting dial operable when the shifting lever is in speed selecting position to condition the shifting mechanism for the desired speed to which it will be shifted when the shifting lever is moved to shifting position.

Further features and advantages of this invention will appear from a detailed description of the drawings in which:

Figure 1 is a diagrammatic layout of a lathe headstock transmission to which this invention is particularly adapted.

Figure 2 is an enlarged fragmentary plan view of the gear shifting mechanism in the lathe headstock.

Figure 3 is a fragmentary vertical section on the line 3—3 of Figures 2 and 5.

Figure 4 is a transverse section on the line 4—4 of Figures 2 and 3.

Figure 5 is a transverse section on the line 5—5 of Figures 2 and 3.

Figure 6 is a diagrammatic layout of the periphery of the control cam drum.

For exemplary purposes, this invention is shown applied to a geared head lathe stock transmission of the change speed type. Such a transmission may comprise an arrangement as best shown in Figure 1 in which the headstock is driven from a main drive motor 10, preferably of a reversible constantly operating type, having a drive pulley 11 connected through suitable belts 12 to the main drive pulley 13 which is mounted on the input drive shaft 14 of the lathe headstock. Suitable disconnecting clutch and brake mechanism 15 connects power from the drive pulley 13 to the drive shaft 16 or brakes rotation of this shaft 16 to stop the lathe transmission when the power from the pulley 13 is disconnected from the shaft 16.

On the shaft 16 is fixed a drive gear 17 which is in driving engagement with the gear 18 fixed on an intermediate shaft 19 suitably journaled in the lathe headstock. Also fixed on the shaft 19 is a gear 20 and a gear 21, the gear 20 being in driving engagement with a gear 22 journaled on a sleeve 23 which sleeve in turn is journaled on the lathe headstock work spindle 24, while the gear 21 in turn drives a gear 25 also journaled on the sleeve 23. A shiftable clutch spool 26 mounted in sliding splined driving relationship on the sleeve 23 has clutch teeth 27 which may engage the clutch teeth 28 formed on the gear 22 so as to lock the gear 22 in driving relationship on the sleeve 23. Also, clutch teeth 29 on the spool 26 may be engaged with clutch teeth 30 formed on the gear 25 so as to lock the gear 25 in driving engagement with the sleeve 23.

The sleeve 23 has fixed to it a gear 31 and a gear 32, each of which gears respectively engage gears 33 and 34 journaled on the back gear shaft 35 of the headstock. A clutch spool 36 is mounted in sliding splined driving relationship on the back gear shaft 35, said spool having clutch teeth 37 adapted to engage clutch teeth 38 of the gear 33 to lock it in driving engagement with the back gear shaft 35. The spool 36 also has clutch teeth 39 adapted to engage the clutch teeth 40 of the gear 34 to lock this gear in driving engagement on the back gear shaft 35.

Journaled on the back gear shaft 35 is a gear 41 which is in driving engagement with a gear 42 of the compound gear 42—43, which compound gear is journaled on the work spindle 24. The gear 43 in turn is adapted to drive a gear 44 of the compound gear 44—45 journaled on the back gear shaft 35. The gear 45 is adapted to drive the gear 46 journaled on the work spindle 24.

A clutch spool 47 mounted in sliding splined driving relationship on the back gear shaft 35, said spool having clutch teeth 48 adapted to engage clutch teeth 49 of the gear 41, serves to lock the gear 41 in driving relationship on the back gear shaft 35 while clutch teeth 50 on the clutch spool 47 may engage clutch teeth 51 on the gear 44 to lock the compound gear 44—45 in driving relationship on the back gear shaft 35.

A clutch spool 52 mounted in sliding splined driving relationship on the work spindle 24, said spool having clutch teeth 53 engageable with clutch teeth 54 of the compound gear 42—43, serves to lock the compound gears 42—43 in driving relationship on the work spindle 24. Clutch teeth 55 of the clutch spool 52 may engage clutch teeth 56 on the gear 46 to lock the gear 46 in driving relationship on the work spindle 24.

Thus, by sequentially shifting the four clutch spools 26, 36, 47, and 52 in a predetermined sequential order, a complete series of sixteen speed changes may be effected in the work spindle 24 and it is the purpose of this invention to provide an improved mechanism for accomplishing this. The clutch spool 26 is actuated by a shifter yoke 57 having an arm 58 pivotally mounted on a pin 59 carried in a support 60 fixed to the headstock. The arm 58 is connected through a coupling 61 to an eye bolt 62 which is mounted for axial movement on the shifter rod 63 mounted for axial sliding movement in the headstock and terminating at one end in a block 64 slidingly guided in guideways 65 in a bracket 66 carried by the headstock. Also provided are resilient yielding means such as the spring 67 confined between the collar 68 and the eye bolt 62 about the shifter rod 63. The purpose of this yieldable connection between the shifter rod 63 and the eye bolt 62 is so that the rod 63 may be shifted into its desired positions of speed selection even though the gears may not have at first fully come into mesh until power is transmitted to the lathe transmission by operation of the main drive clutch 15. Suitable means for maintaining the clutch spool in operative position such as the spring ball detent means indicated generally at 68a are also provided.

Similarly, the clutch spool 36 is actuated by the shifter yoke 69 having an arm 70 pivotally mounted on a suitable pivot pin 71 carried in a bracket 72 fixed to the headstock of the lathe. The upper end of the arm 70 is connected through a coupling 73 to an eye bolt 74 slidably mounted on the shifter rod 75. Resilient spring devices 76 confined between the collar 77 fixed on the shifter rod 75 provide the resilient interconnection between the rod 75 and the eye bolt 74. Spring ball detent means 77a are also provided. The rod 75 terminates in the block 78 guided in guideways 79 formed in the bracket 66 of the headstock.

The clutch spool 47 is actuated by means of a shifter yoke 80 having an arm 81 pivotally mounted on a suitable pivot pin 82 carried in a bracket 83 secured to the headstock. The upper end of the arm 81 is connected through a coupling 82a to an eye bolt 83a axially slidable on the shifter rod 84 and confined resiliently thereon by suitable springs 85 confined between the collars 86 secured to the rod 84 and the eye bolt 83a, the rod 84 terminating in a slide block 87 carried in the guideways 88 formed in the bracket 66. Also provided are the spring ball detent means indicated generally at 86a.

The clutch spool 52 is actuated by the shifter yoke 89 having an arm 90 terminating in a boss 91 axially slidable relative to the shifter rod 92 and resiliently confined axially thereon by suitable spring means 93 confined between the collars 94 fixed on the rod 92 and the boss 91 of the shifter yoke 89. Spring ball detent means indicated generally at 94a are also provided. The rod 92 terminates in a slide block 95 guided in guideways 96 in the bracket 66 of the headstock. The resilient spring means 76, 85, and 93 perform the same function in connection with their respective clutch spools as that of the spring 67 already described. The spring ball detent means 77a, 86a, and 94a perform the same function in connection with their respective shifter rods and clutch spools as that depicted at 68a and already described.

Pivotally connected to each of the respective slide blocks 64, 78, 87, and 95 are the respective levers 97, 98, 99, and 100 which terminate at their other ends in downwardly extending cam pins 101, 102, 103, and 104 which operate in the respective cam slots 105, 106, 107, and 108 formed in the periphery of the selector cam drum 109 which is journaled on suitable trunions 110 and 111 in the brackets 112 and 113 secured to the headstock of the lathe by bolts 114 which pass upwardly through a T-slot strip 115 into the headstock.

The selector cam drum 109 may be rotated by the selector hand wheel 116a carried on a shaft 116 suitably journalled in the headstock and having a bevel gear 117 which operatively engages a bevel gear 118 formed on the selector cam drum 109. The dial 119 may carry indices 119a showing the various selected speeds for the lathe headstock. Rotation of the cam drum 109 by the hand wheel 116a effects the predetermined sequential positioning of the various cam pins 101, 102, 103, and 104 to reorient these ends of the respective lever arms 97, 98, 99, and 100 for preselecting or prepositioning them for the next desired speed change to be made for the headstock.

The cam slots 105, 106, 107, and 108 in the selector cam drum 109 may take the form shown in Figure 6 in which there is provided a neutral position 120 in which all of the clutch spools 26, 36, 47, and 52 are moved to neutral or disconnected positions and in which there are provided a series of sixteen speed changes 121 by the sequential movement of the various clutch spools. While the various cam slots 105, 106, 107, and 108 position the various lever arms 97, 98, 99, and 100 in a predetermined sequential order for any desired speed for the headstock, they do not function directly to actually shift the clutch spool. This is accomplished by a second control device comprising two pairs of step-shaped positioning plates 122—123 and 124—125. The plates 122 and 123 are secured together with a suitable spacing member 126 by screws 127 and on the under surface of the plate 123 is secured a T-shaped slide member 128 by suitable screws 129, the T-shaped member 128 nicely sliding in the T slot bar 115 for sliding movement of the positioning plates 122—123. Similarly, the plates 124—125 are secured together with suitable spacer plate members 130 by suitable screws 131. On the bottom of the member 125 is secured a T-shaped guide member 132 by suitable screws 129 which also slides in the T slot bar member 115. The positioning plate members 122—123 and the member 124—125 are oppositely reciprocatable to and from each other by a common rock shaft 133 appropriately journaled in the headstock actuated by the shifter lever 134 having a pinion 135 formed on its inner end which engages a rack 136 on the bracket member 137 secured to the upper plate member 122 and also engages the rack 138 secured to the upper member 124 so that rocking of the control lever and shaft 133 causes the vises to move to and from each other.

Each of the step-shaped members 122—123 has opposing abutment surfaces 139, 140, 141, and 142 corresponding to the respective levers 97, 98, 99, and 100 intermediate of which ends are provided the respective shifting pins 143, 144, 145, and 146. When the shifter lever 134 is moved from the selecting position 134a to shift position 134b, the respective abutment surfaces 139, 140, 141, and 142 engage the pins 143, 144, 145, and 146 so as to cause their respective levers, which are locked by their pins 101, 102, 103, and 104 in the cam slots of the selector cam drum 109, to actuate the slide blocks and respective shifter rods 63, 75, 84, and 92 to shift the clutch spools to the desired positions. When the shifter lever 134 is moved to the selector position 134a, the step positioning plate members 122—123 and 124—125 are moved apart so as to release the abutment surfaces from their pins 143, 144, 145, and 146 so that the selector hand wheel 116a may rotate the cam drum in an effortless manner to reorient the various lever arms 97, 98, 99, and 100 by repositioning the ends containing the cam slot pins 101, 102, 103, and 104. After having thus preselected the next desired speed, the shifter lever 134 is then moved again from position 134a back to position 134b causing the step-shaped positioning plates to engage the pins and the intermediate portion of the lever arms 97, 98, 99, and 100 and again reshift the clutch spools to the next desired speed change. Thus, while the selected speed may be preobtained by adjusting the selector hand wheel 116a the actual shifting of the clutch spool was accomplished by manipulating the lever 134 from position 134a to position 134b. It is also to be noted that the adjustment of the selector hand wheel may be accomplished without in any way interfering with the gear movement. Thus, when the control lever 134 is moved back to selector position 134a, the clutch spools being retained in operative position by ordinary means such as the spring ball detent means herein depicted, the next selected speed can then be set up and made ready to go simply by turning the hand wheel 116a to a desired speed selection as indicated on the dial 119. The operator need then only move the shifter lever 134 from position 134a to position 134b to instantly put in operation the next desired speed as so preselected by operation of the selector hand wheel 116a.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a transmission gear shifting mechanism, a preselecting means comprising a dial, a cam drum, and a series of levers positioned by rotation of said drum and in operative connection with the shiftable clutch members of said transmission, and a shifting mechanism actuated by a shifter lever so as to operatively engage and have said series of levers to actuate said shiftable clutch members of said transmission to cause a change in the speed of said transmission from that at which it was initially operating to the one preselected by said preselecting means.

2. In a headstock transmission gear shifting mechanism for lathe, a preselecting means comprising, a speed indicating dial, a cam drum, and a series of levers positioned by rotation of said drum and in operative connection with the shiftable clutch member of said transmission, shifting mechanism engaging said series of levers operable to actuate said shiftable clutch members to cause speed changes in said transmission, and a shifter lever for actuating said shifting mechanism, said shifter lever being reversible from shifting position to speed selection position in such a manner that the next desired speed for said transmission may be selected by said preselecting means while said transmission is operating at its previously selected speed.

3. In a gear shift mechanism for lathe headstock, a gear train, a plurality of shiftable clutch members for effecting different speed combinations among the gears in said train, a preselecting means comprising a cam drum, a speed indicating dial and a series of levers positioned by said drum, means operatively connecting said levers with said shiftable clutch members, shifting mechanism arranged to engage and actuate said series of levers to shift said clutch members, a shifter lever for actuating said shifting mechanism, said shifter lever being reversible from shift position to speed selection position, means for maintaining said shiftable clutch members in effective operative contact with said gears while said shifter lever is moved from shift position to speed selection position, and a hand wheel associated with said dial to actuate said preselecting means so as to reposition said series of levers for the speed next desired in the gear shift mechanism while said shifter lever is in speed selection position and while said mechanism is operating at its initially selected speed.

4. In a gear shift transmission mechanism for lathe headstock having a plurality of shiftable clutch members, means for sequentially shifting said clutch members in a predetermined order so as to obtain a series of speed changes in the work spindle of said lathe, said means comprising a series of levers pivotally attached at one end to shifter rods connected to their respective clutch members and at the other end to a rotatable actuating cam drum, means for rotating said drum including a speed indicating dial, shifting mechanism arranged to also actuate said levers to thereby force said clutch members into operative position in said transmission, a shifter lever for actuating said shifting mechanism, and means for maintaining said clutch members in operative position while said shifting mechanism is actuated by said shifter lever so as to release said series of pivotally connected levers and permit their repositioning for a preselected speed by further rotation of said cam drum.

5. In a gear shift transmission mechanism for lathe headstock having a plurality of shiftable clutch members, means for shifting said clutch members in a predetermined sequential order, said means comprising a series of levers each pivotally connected at one end to shifter rods connected to their respective clutch members and said levers being connected at their other ends to a rotatable actuating cam drum, shifting mechanism for engaging said series of levers intermediate their respective ends, means including a hand wheel and a speed indicating dial for rotating said cam drum engaging drum so that the cam end of each of the levers of said series of levers may be moved without causing shifting movement of the shifter rod connected ends, a shifter lever which when moved to shift position causes said shifting mechanism to engage said series of levers and effect shifting movement of the shifter rod connected ends of each lever of said series of levers to thus engage said clutch members while the cam drum engaging ends of said levers are at the same time being held in fixed position by said cam drum.

6. In a gear shift transmission mechanism for lathe headstock having a plurality of shiftable clutch members, means for shifting said clutch members in a predetermined sequential order, said means comprising a series of levers each pivotally connected at one end to shifter rods for actuating the clutch members of the transmission, and connected at their other ends to be actuated by a rotatable cam drum, shifting mechanism engaging said series of levers intermediate their respective ends, means for rotating said cam drum including a hand wheel and speed indicating dial so that the cam drum actuates ends of each of the levers of said series of levers may be moved without causing shifting movement of the shifter rod engaging ends, a shifter lever actuable to shift position causes said shifting mechanism to engage said series of levers and thus effect shifting movement of the shifter rod engaging ends of each lever of said series of levers to thus engage said clutch members while the cam drum actuated ends of said levers are at the same time being held in fixed position by said cam drum, and means for holding said clutch members in engagement while said shifter lever is moved to release position thereby again permitting movement of the cam drum actuated ends of each of the levers of said series of levers so that each may be repositioned for the next selected speed by further rotation of said cam drum.

7. In a gear shift transmission mechanism for lathe headstock, a plurality of shiftable clutch members, shifter rods for said clutch members, levers pivotally connected to and depending from said shifter rods, a cam drum to which the other ends of said levers are connected, means for rotating said cam drum so as to position said levers so that said clutch members may be engaged in said transmission to cause a series of predetermined sequential speeds and a neutral position for the work spindle of said lathe headstock, a dial operating in conjunction with said last mentioned means to indicate each of the speed positions and the neutral position for said clutch members, shifting means arranged to actuate said levers intermediate their ends so as to shift said clutch members to the speed or neutral position as selected by rotating said cam drum and indicated by said dial, a shifter lever for bringing said shifting mechanism into operative contact with said levers and release therefrom, and means for holding said clutch members in engagement in said transmission when the shifting mechanism is released from said series of levers to thus permit said levers to be repositioned by said cam drum in order to preselect the next speed desired for said work spindle.

8. In a gear shift transmission mechanism for lathe headstock having a plurality of clutch members for effecting a series of predetermined sequential speeds and a neutral position for free rotation of the work spindle of said headstock, means for preselecting a desired speed or neutral position for said work spindle while said spindle is operating at its initially selected speed comprising shifter rods for said clutch members, a series of levers pivotally fastened at their one ends to said shifter rods and actuably connected at their other ends to a rotatable cam drum in such a way that the cam ends of said levers may be moved by rotation of said cam drum actuated drum without causing shifting movement of said shifter rods and that the shifter rod connected to said levers may be shifted while the cam drum actuated ends are held in fixed position by said cam drum, means including a hand wheel and speed indicating dial for rotatting said cam drum so as to position said series of levers for the desired speeds for said work spindle, shifting means for operatively engaging said levers intermediate their ends to cause shifting of said rods and said clutch members to the position selected by said cam drum rotating means, a shifter lever for moving said shifting mechanism into engagement with said series of levers and/or to release said shifting mechanism therefrom, and means for holding said clutch members in operative engagement in said transmission while said cam drum rotating means are utilized to further rotate said cam drum to preselect the next speed desired for the work spindle while it continues at the speed initially selected.

9. In a gear transmission for lathe headstock, drive means, a work spindle, a sleeve journaled on said spindle, a pair of gears fixed to said sleeve, a pair of gears journaled on said sleeve and in operative relation with said drive means, a shiftable clutch member for engaging either of said pair of journaled gears to thus cause said sleeve to be driven by said drive means, a back gear shaft, a pair of gears journaled on said back gear shaft and in operative engagement with said pair of gears fixed on said sleeve, a shiftable clutch member for bringing either of said pair of journaled gears of said back gear shaft into fixed driving relationship with said back gear shaft, a single gear and a compound gear journaled on said back gear shaft and a sliding clutch member for bringing either said single gear or said compound gear into fixed driving relationship with said back gear shaft, a compound gear journaled on said work spindle and in operative engagement with said single gear of said back gear shaft and one gear of said compound gear of said back gear shaft, a single gear journaled on said work spindle and in operative engagement with the other gear of said compound gear of said back gear shaft, a clutch member on said work spindle for bringing either said compound gear of said work spindle or said single gear of said work spindle into driving relationship with said work spindle, and means for actuating said clutch members so as to produce a sequence of predetermined speeds and a neutral position for said work spindle.

10. In a gear transmission for lathe headstock, drive means, a work spindle, a sleeve journaled on said work spindle, a pair of gears journaled on said sleeve and in geared connection with said drive means, a shiftable clutch member on said sleeve for bringing either of said journaled gears into fixed driving relationship with said sleeve to thereby cause said sleeve to be driven by said drive means, a pair of gears fixed on said sleeve, a back gear shaft, a pair of gears journaled on said back gear shaft and in geared connection with the gears fixed on said sleeve, a shiftable clutch member for bringing either of said gears of said back gear shaft into fixed driving relationship with said back gear shaft so that said back gear shaft may thus be driven by said drive means through said sleeve at a plurality of speeds, and a plurality of geared means for driving said work spindle from said back gear shaft in a series of different speeds and a neutral position.

11. In a gear transmission for lathe headstock, drive means, a work spindle, a sleeve journaled on said work spindle, a pair of gears journaled on said sleeve and in geared connection with said drive means, a shiftable clutch member on said sleeve for bringing either of said journaled gears into fixed driving relationship with said sleeve to thereby cause said sleeve to be driven by said drive means, a pair of gears fixed on said sleeve, a back gear shaft, a pair of gears journaled on said back gear shaft and in geared connection with the gears fixed on said sleeve, a shiftable clutch member for bringing either of said gears of said back gear shaft into fixed driving relationship with said back gear shaft so that said back gear shaft may thus be driven by said drive means through said sleeve at a plurality of speeds, and a plurality of geared means for driving said work spindle from said back gear shaft in a series of different speeds and a neutral position comprising a single gear and a compound gear both journaled on said back gear shaft, a shiftable clutch member for bringing either said single gear or said compound gear into driving relationship with said back gear shaft, a compound gear and a single gear both journaled on said work spindle so that said last mentioned compound gear is in geared connection with said first mentioned single gear and said first mentioned compound gear, and so that said last mentioned single gear is in geared connection with said first mentioned compound gear, and a shiftable clutch member for bringing either said last mentioned compound gear or said last mentioned single gear into driving relationship with said work spindle.

HOWARD E. LAUBACH.
ROBERT C. JOHNSON.
VINCENT J. KRAMER.

REFERENCES CITED

The following references are of record in the file of this patent:

UNITED STATES PATENTS

| Number | Name | Date |
| --- | --- | --- |
| 1,257,311 | Burns | Feb. 26, 1918 |
| 1,997,841 | Twamley | Apr. 16, 1935 |
| 2,177,746 | Randol | Oct. 31, 1939 |
| 2,193,432 | Randol | Mar. 12, 1940 |
| 2,266,696 | Wettig | Dec. 16, 1941 |
| 2,330,580 | Hautsch | Sept. 28, 1943 |
| 2,357,952 | Hoelscher | Sept. 12, 1944 |
| 2,365,571 | Lloyd | Dec. 19, 1944 |
| 2,429,160 | Helmstein et al. | Oct. 14, 1947 |